United States Patent [19]

Nakamura

[11] Patent Number: 5,049,994
[45] Date of Patent: Sep. 17, 1991

[54] SYSTEM FOR CONVERTING INTERLACED VIDEO SIGNALS TO SEQUENTIAL VIDEO SIGNALS

[75] Inventor: Katsumi Nakamura, Misato, Japan

[73] Assignee: Sharp Kabushiki Kaisha, Osaka, Japan

[21] Appl. No.: 518,526

[22] Filed: May 3, 1990

[30] Foreign Application Priority Data

May 13, 1989 [JP] Japan ................................. 1-120128

[51] Int. Cl.⁵ ............................................. H04N 7/01
[52] U.S. Cl. ..................................... 358/140; 358/11
[58] Field of Search ..................... 358/11, 12, 140, 138

[56] References Cited

U.S. PATENT DOCUMENTS

4,698,676 10/1987 Kubata et al. ...................... 358/140
4,733,300 3/1988 Sugiyama et al. .................. 358/140
4,791,487 12/1988 Kozuki et al. ...................... 358/140
4,897,716 1/1990 Drewery et al. ................... 358/140

Primary Examiner—Victor R. Kostak

[57] ABSTRACT

A system converter device converts video signals based on the MUSE system to video signals based on the NTSC system. First, the number of scanning lines of each odd number field and each even number field of a MUSE signal is converted to 525 lines by a signal processing circuit. Registration processing portion positions the scanning line signals of continuous even and odd number fields to coincide with each other. The degradation of video signals caused by conversion is prevented because the number of scanning lines are directly converted to the desired number of lines. The circuit configuration of this system converter device is also simplified.

6 Claims, 5 Drawing Sheets

SYSTEM FOR CONVERTING INTERLACED VIDEO SIGNALS TO SEQUENTIAL VIDEO SIGNALS

BACKGROUND OF THE PRESENT INVENTION

1. Field of the Present Invention

The present invention generally relates to system converter devices for video signals, and more particularly, to a system converter device for converting video signals based on an interlaced scanning system to video signals based on an sequential scanning system. The present invention has particular applicability to a system converter device for converting video signals based on a MUSE system to video signals based on a NTSC system.

2. Description of the Background Art

In a high definition television system, 1,125 scanning lines are defined per frame, the interlace ratio is defined as 2:1, and the aspect ratio is defined as 16:9. One channel of satellite broadcasting has a bandwidth of 27 MHz. In satellite broadcasting, video signals based on a high definition television system are bandwidth compressed to 8.1 MHz and transmitted through one channel. This transmission system is called "Multiple Sub-Nyquist Sampling Encoding" (hereinafter referred to as MUSE).

This MUSE transmission system is known as a multi-subsampling transmission system utilizing offset sub-sampling between two fields or two frames. In the MUSE transmission system, line sequential time axis integration (TCI) is employed, where the red color difference signal R−Y and the blue color difference signal B−Y are time axis compressed to ¼, and the compressed signals are time axis multiplexed during the horizontal blanking period of the luminance signal Y. That is to say, the compressed red color difference signals R−Y are multiplexed on odd number lines, while the compressed blue color difference signals B−Y are multiplexed on even number lines.

Figure 1:
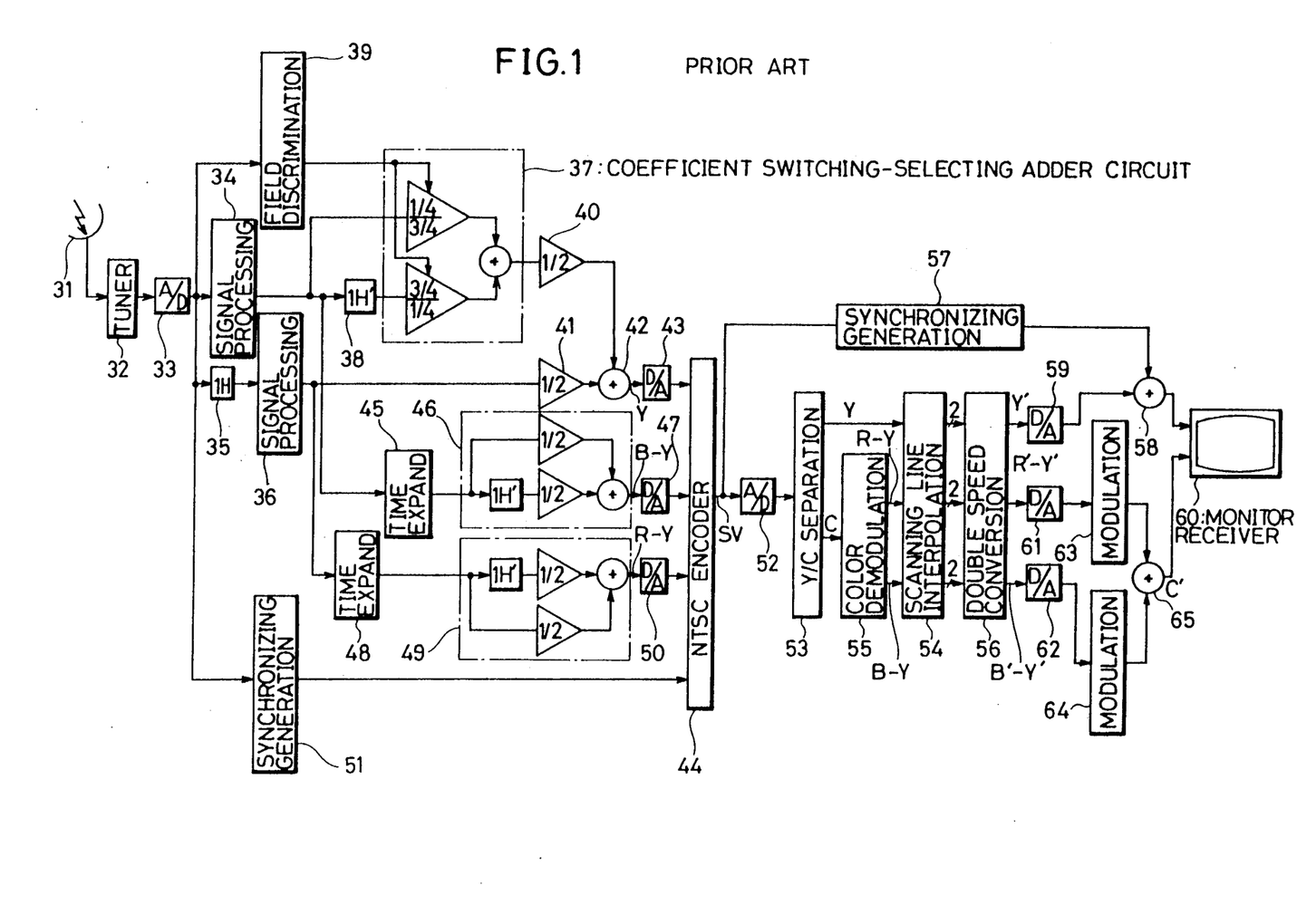
FIG. 1 is a circuit block diagram showing a conventional system converter device.

When a reproduced image from video signals based on a high definition television system such as the MUSE transmission system, is to be displayed by a television receiver under using a sequential scanning system with 525 scanning lines per field, and with an aspect ratio of 4:3, for example, the video signals of the high definition television system are first converted to video signals based on a NTSC system, whereupon these converted video signals are sequentially scan. FIG. 1 shows such an example of a conventional system converter device.

Referring to FIG. 1, a satellite broadcasting signal received by an antenna 31 is applied to a tuner 32. The MUSE signal provided from tuner 32 is applied to an A/D converter 33, where it is converted to a digital signal to be applied to a signal processing circuit 34.

In the signal processing circuit 34, 525 lines of scanning line data are produced in accordance with the data of every even number horizontal scanning line of the MUSE signal. Also in signal processing circuit 34, a portion of the luminance signal Y and the blue color difference signal B−Y are extracted from each scanning line signal to convert the aspect ratio for achieving the aspect ratio of 4:3 required in the NTSC system. The signal processing circuit 34 also stores the image data of the extracted luminance signal Y and the blue color difference signal B−Y in a memory (not shown) in response to a clock signal having a frequency relevant to the MUSE system, whereupon the stored data is read out in response to a clock signal having a frequency relevant to the NTSC system. This causes the horizontal period of each scanning line to be time axis expanded from 29.6 μsec of the MUSE signal to 63.5 μsec of the NTSC system.

The MUSE signal provided from A/D converter 33 is also applied to a signal processing circuit 36 via a delay element 35 having a delay time of 1 horizontal period (hereinafter referred to as "1H"). Accordingly, the timing of the scanning line signal having the red color difference signal R−Y is multiplexed to coincide with the timing of the scanning line signal having the blue color difference signal B−Y multiplexed. "1H" is equivalent to 1 horizontal period of the high definition television system, and the period of time is 29.6 μsec.

The signal processing circuit 36 produces the scanning line data of 525 lines according to the data from every odd number scanning line of the MUSE signal. Also, in signal processing circuit 36, a portion of the luminance signal Y and the red color difference signal R−Y are extracted from each scanning line signal to convert the aspect ratio to an aspect ratio of 4:3 required in the NTSC system. The signal processing circuit 36 stores the image data of the extracted luminance signal Y and the red color difference signal R−Y in a memory not shown, where the stored data is read out in response to a clock signal having a frequency relevant to the NTSC system. This causes the horizontal period of each scanning line to have the time axis expanded to 29.6 μsec of the MUSE signal from 63.5 μsec of the NTSC system.

A coefficient switching-selecting adder circuit 37 receives the scanning line signal having a blue color difference signal B−Y multiplexed from signal processing circuit 34. Furthermore, this scanning line signal is applied to coefficient switching-selecting adder circuit 37 via a delay element 38 having a delay time of one horizontal period (1H'). "1H'" indicates one horizontal period of the NTSC system, in which the period of time is equivalent to 63.5 μsec.

The MUSE signal provided from A/D converter 33 is also applied to a field discrimination circuit 39. The discrimination signal provided from field discrimination circuit 39 is applied to coefficient switching-selecting adder circuit 37 as a control signal. The coefficient switching-selecting adder circuit 37 adds the signal including the current signal multiplied by a coefficient of ¼ and the signal including the 1H' delayed signal multiplied by a coefficient of ¾ in response to the discrimination signal, to process odd number fields. To process even number fields, the signal including the current signal multiplied by a coefficient of ¾ and the signal including the 1H' delayed signal multiplied by a coefficient of ¼ are added.

Coefficient multiplier 40 multiplies by a coefficient of ½ with the scanning line signal provided from coefficient switching-selecting adder circuit 37 having a blue color difference signal B−Y multiplexed. Similarly, coefficient multiplier 41 multiplies by a coefficient of ½ with the scanning line signal provided from signal processing circuit 36 and having a red color difference signal R−Y multiplexed. The output signals from coefficient multipliers 40 and 41 are added by an adder 42 to produce a luminance signal Y.

It can be appreciated from the previous description that since coefficient switching-selecting adder circuit 37 switches the coefficients by which the current signal and the 1H' delayed signal are multiplied in each of the even number field and the odd number field, the luminance signal Y provided from adder 42 has an interlaced position between the mutual adjacent odd number field and even number field. The luminance signal Y provided from adder 42 is converted to an analog signal by a D/A converter 43 to be applied to a NTSC encoder 44.

The output signal of signal processing circuit 34 is also provided to a time axis expanding circuit 45, where the blue color difference signal B−Y having the time axis compressed to ¼ the period of time is expanded. The expanded blue color difference signal B−Y is provided to an intra-field interpolation circuit 46, where weighted mean processing between the two scanning line signals is performed. The output signal of intra-field interpolation circuit 46 is converted to an analog signal by a D/A converter 47 to be provided to NTSC encoder 44.

The output signal of signal processing circuit 36 is provided to a time axis expanding circuit 48, where the red color difference signal R−Y having the time axis compressed to ¼ the period of time is expanded. The expanded red color difference signal R−Y is provided to an intra-field interpolation circuit 49, where weighted mean processing between the two scanning line signals is performed. The output signal of intra-field interpolation circuit 49 is converted to an analog signal by a D/A converter 50 to be provided to NTSC encoder 44.

The MUSE signal provided from A/D converter 33 is also applied to a synchronizing signal generating circuit 51. The synchronizing signal generating circuit 51 is responsive to a synchronizing signal included in the MUSE signal to generate a synchronizing signal according to the NTSC system. This synchronizing signal of the NTSC system is applied to encoder 44. The encoder 44 adds the synchronizing signal to the luminance signal Y, as well as, produces a carrier chrominance signal C by quadrature two-phase modulation of the color difference signals R−Y and B−Y. By adding the luminance signal Y and the chrominance signal C, a video signal SV for the NTSC system is generated.

The video signal SV generated from encoder 44 is converted to a digital signal by an A/D converter 52 to be applied to a Y/C separation circuit (luminance signal/color signal separation circuit) 53. The separated luminance signal Y from Y/C separation circuit 53 is applied to a scanning line interpolation circuit 54. The separated chrominance signal C from Y/C separation circuit 53 is provided to a color demodulation circuit 55. The color difference signals R−Y and B−Y provided from color demodulation circuit 55 are applied to scanning line interpolation circuit 54. The scanning line interpolation circuit 54 generates interpolation scanning line signals in accordance with the main scanning line signal of each luminance signal Y and color difference signals R−Y and B−Y, respectively. The main scanning line signals and the interpolation scanning line signals of the luminance signal Y, the color difference signals R−Y and B−Y provided from scanning line interpolation circuit 54 are applied to a double speed conversion circuit 56, where double speed conversion process is carried out. That is to say, each interpolation scanning line signal is inserted between the main scanning line signals. As a result, a luminance signal Y', color difference signals R'−Y' and B'−Y' of the sequential scanning line system having 1 horizontal period compressed to H'/2 (525 lines/field) are generated.

The video signal SV provided from encoder 44 is applied to a synchronizing signal generating circuit 57. The synchronizing signal generating circuit 57 generates a synchronizing signal according to the sequential scanning line system in response to a synchronizing signal based on the NTSC system. The synchronizing signal of the sequential scanning system is provided to an adder 58. The double speed conversion circuit 56 applies the luminance signal Y' to a D/A converter 59, where the luminance signal Y' is converted to an analog signal. The adder 58 adds the synchronizing signal to the converted luminance signal Y'.

Each color difference signals R'−Y' and B'−Y' provided from double speed conversion circuit 56 are converted, to analog signals by D/A converters 61 and 62 to be applied to modulation circuits 63 and 64, respectively. At each modulation circuit 63 and 64, two subcarriers having a phase difference of 90° to each other are balance modulated in response to the color difference signals R'−Y' and B'−Y'. The output signals from modulation circuits 63 and 64 are added at adder 65, where a carrier chrominance signal C' is generated.

A monitor receiver 60 receives a luminance signal Y" having a synchronizing signal added from adder 58, and a chrominance signal C' provided from an adder 65. Consequently, an image according to the sequential scanning system of 525 scanning lines/field (non-interlaced system) is displayed on the display screen of monitor receiver 60.

From the above description of the circuit shown in FIG. 1, the 1,125 horizontal scanning lines of the MUSE signal is first reduced to 525 lines and then increased to 1,050 lines by the double speed conversion process. Such a process causes degradation in the quality of the displayed image, in addition to increasing the size and complexity of the circuit configuration. Furthermore, since MUSE signals are based on line sequential TCI, the separated luminance signal Y and the color difference signals R−Y and B−Y are mixed to produce a video signal for the NTSC system. It is pointed out that the process of sequential scanning conversion by separating these mixed signals again causes degradation in the quality of the picture.

SUMMARY OF THE PRESENT INVENTION

An object of the present invention is to prevent degradation in conversion of video signals in a system converter device for video signals.

Another object of the present invention is to simplify the circuit configuration of the system converter device for video signals.

In summary, the system converter device in accordance with the present invention converts a first video signal according to the interlaced scanning system having a first predetermined plurality of scanning lines to a second video signal according to sequential scanning system having a second predetermined plurality of scanning lines. The system converter device comprises a circuit for receiving the first video signal, a conversion circuit for converting the number of each field's scanning lines included in the first video signal to a second number of plurality of scanning lines, and a registration circuit for positioning the converted scanning line signals of two continuous fields.

In operation, the conversion circuit converts the number of scanning line signals of each field included in the first video signal to a second number, and the registration circuit positions the scanning line signals of the two continuous fields. The number of scanning line signals is directly converted to the second number from the first number to prevent degradation in the video signal. Additionally, the circuit for constructing the system converter device is simplified.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 2:
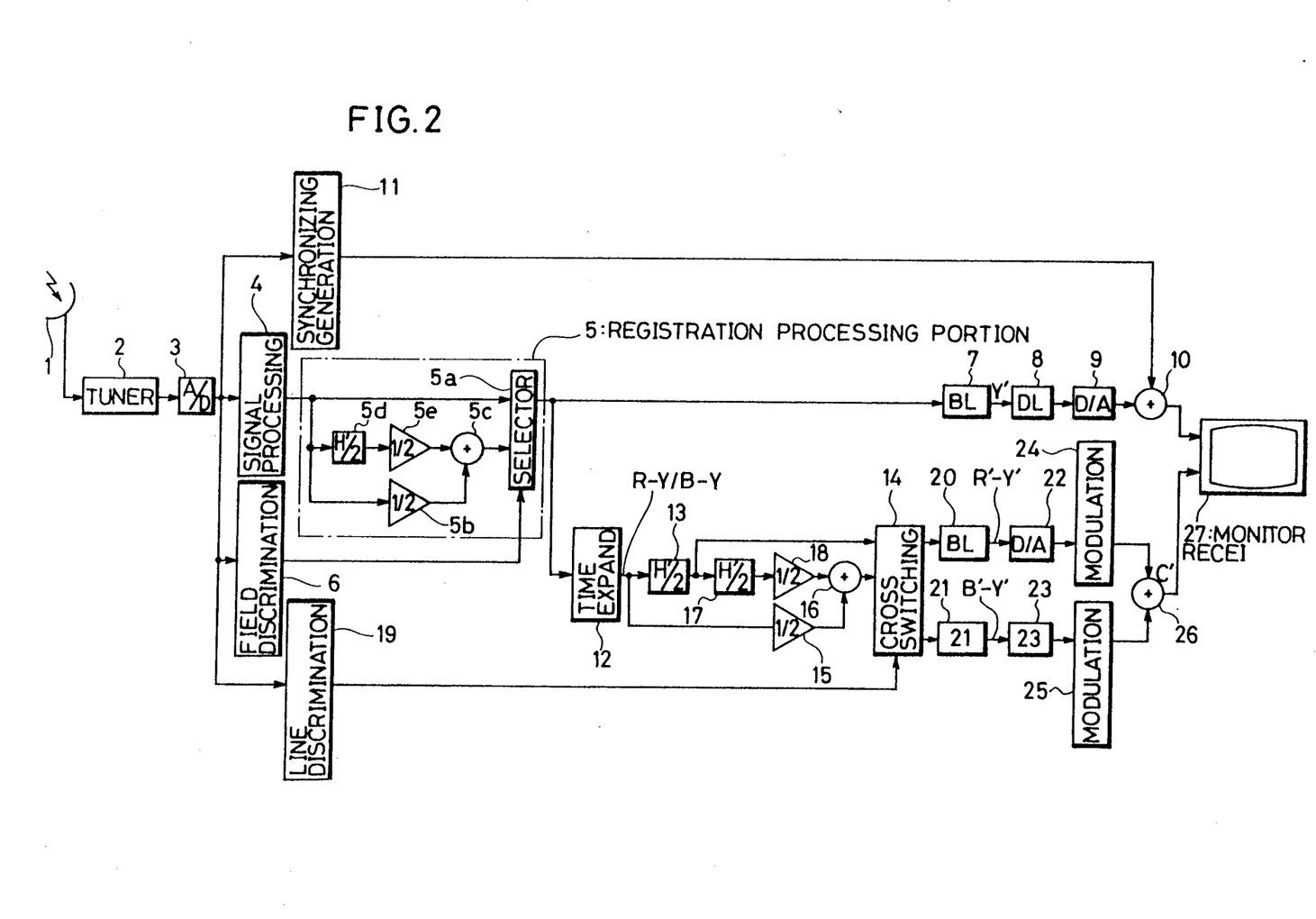
FIG. 2 is a circuit block diagram of a system conversion circuit showing one embodiment of the present invention.

In the embodiment of FIG. 2, a MUSE signal transmitted through satellite broadcasting is used as a video signal based on the interlaced scanning system having 1,125 scanning lines per frame. Referring to FIG. 2, a satellite broadcasting signal received by an antenna 1 is applied to a tuner 2. The MUSE signal provided from tuner 2 is converted to a digital signal by an A/D converter 3. The converted digital MUSE signal is applied to a signal processing circuit 4. An example of the signal processing circuit 4 is shown in FIG. 5.

Figure 5:
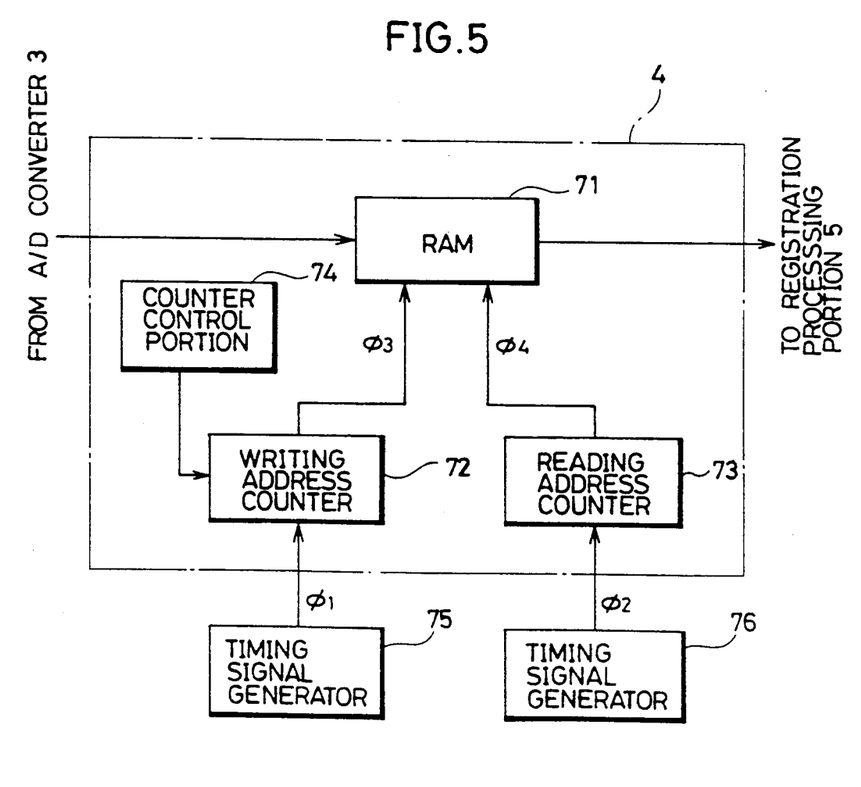
FIG. 5 is a block diagram showing an example of the signal processing portion 4 of FIG. 2.

Referring to FIG. 5, the signal processing circuit 4 comprises a random access memory (hereinafter referred to as "RAM") 71, a writing address counter 72, a reading address counter 73, and a counter control portion 74 for controlling counter 72 to operate intermittently. Counters 72 and 73 are connected to receive predetermined clock signals $\phi1$ and $\phi2$ from timing signal generators 75 and 76, respectively. Clock signal $\phi1$ has the frequency of 8.1 MHz based on the 1,125 lines interlaced scanning system. Clock signal $\phi2$ has the frequency of 5.67 MHz based on the 525 line sequential scanning system.

Figure 3:
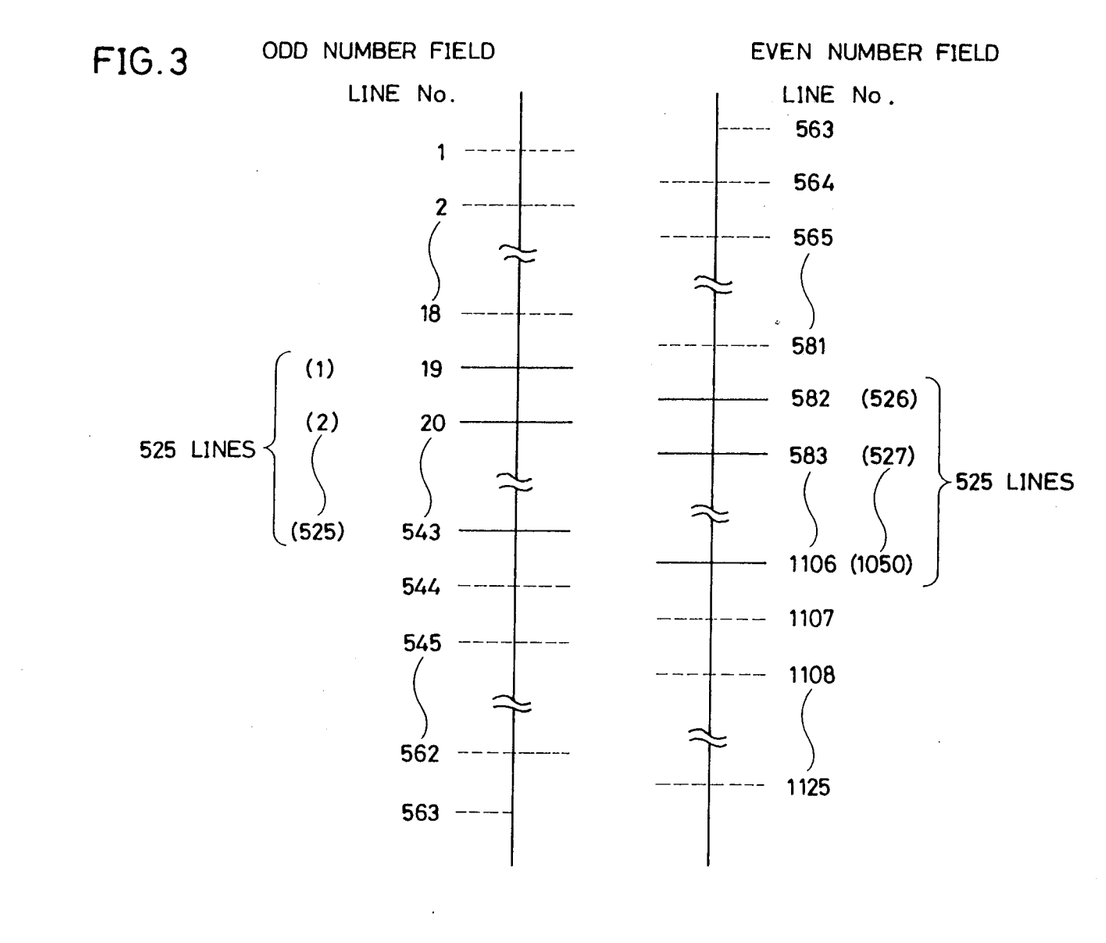
FIG. 3 is a schematic diagram showing the relation of the positions of the scanning lines converted by the signal processing circuit 4 of FIG. 2.

The signal processing circuit 4 generates 1,050 lines of scanning line signals by omitting 75 scanning lines from the 1,125 scanning lines of the MUSE signal. That is to say, the number of scanning lines for each odd number field and each even number field is converted to 525. A schematic diagram for explaining the conversion of the number of scanning lines is shown in FIG. 3. Referring to FIG. 3, the scanning lines remaining after the conversion are indicated in solid lines, while the omitted scanning lines are indicated in broken lines. At signal processing circuit 4, a portion of the luminance signal Y and color difference signals B−Y and R−Y are extracted from each scanning line signal to correspond to the aspect ratio of 4:3. In other words, conversion of the aspect ratio is carried out. In signal processing circuit 4, the image data of each extracted luminance signal Y and color difference signals B−Y and R−Y are stored in RAM 71 in response to a writing address signal $\phi3$ provided from counter 72, as shown in FIG. 5. The stored data is read out in response to a reading address signal $\phi4$ provided from counter 73. As a result, each of luminance signal Y and color difference signals B−Y and R−Y has the time axis expanded so that the horizontal period of each signal being 29.6 μsec in the MUSE signal becomes H'/2 of the sequential scanning system, i.e., 63.5/2 μsec. It seen from FIG. 3 that the scanning line signals of each odd number field and even number field having the scanning lines converted by signal processing circuit 4 are in an interlaced position with respect to each other.

In writing operation, counter control portion 74 operates writing address counter 72 intermittently. In other words, counter 72 halts for a period of time corresponding to the 75 lines to be omitted of the 1,125 scanning lines (a time period of 75 horizontal periods in one vertical period) in response to a control signal from counter control portion 74. Counter 72 also halts for a period of time corresponding to 1/5 of the time of a horizontal scanning period from both sides of each horizontal scanning line, for the purpose of converting the aspect ratio of 5:3 to 4:3. In reading operation, the written data is read out continuously in response to a reading address signal $\phi4$ provided from counter 73.

Figure 4:
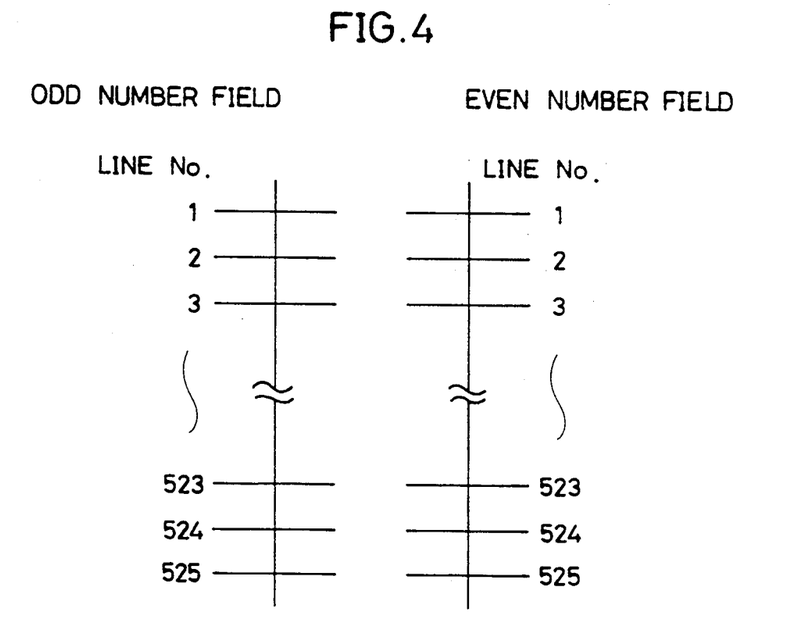
FIG. 4 is a schematic diagram showing the relation of the positions of the scanning lines provided from the registration processing portion 5 of FIG. 2.

Referring to FIG. 4, horizontal scanning lines having 525 scanning lines per field according to the sequential scanning system is shown. The position of the scanning lines of the odd number field should coincide with the position of the scanning lines of the even number field, as shown in FIG. 4. It is therefore necessary to position the scanning line signals provided from signal processing circuit 4 so that the position of one of the scanning line signal of each odd number field or even number field agrees with the position of the other scanning line. Thus, the output signal of signal processing circuit 4 is applied to a registration processing portion 5.

A coefficient multiplier 5b multiplies the output signal of signal processing circuit 4 by a coefficient of ½. This multiplied data is applied to an adder 5c. At the same time, the output signal of signal processing circuit 4 is applied to a coefficient multiplier 5e through a delay element 5d having a delay time of 1 horizontal period (H'/2), where a coefficient of ½ is multiplied. The multiplied data is applied to adder 5c. The output signal of adder 5c is applied to a selector 5a. The output signal of adder 5c indicates the weighted mean value of the current signal and the signal of one previous line. The scanning line thereof is in an interlaced position with the current signal.

The MUSE signal provided from A/D converter 3 is also provided to a field discrimination circuit 6. The discrimination signal generated from field discrimination circuit 6 is applied to selector 5a as a control signal. The selector 5a selects the output signal of signal processing circuit 4 at an odd number field and selects the output signal of adder 5c at an even number field, for example. Accordingly, the position of the scanning line signal of the odd number field provided from selector 5a coincides with the position of the current signal, while the position of the scanning line signal of the even number field is in an interlaced position with respect to the current signal. As a result, the position of the scanning line signals of the odd number field coincides with the position of the even number field, as shown in FIG. 4.

A signal having 525 scanning lines per field is provided from selector 5a to be applied to a blanking adding circuit 7. The output signal of selector 5a is a TCI signal having color difference signals R−Y and B−Y multiplexed during the horizontal blanking period. The adding circuit 7 adds horizontal and vertical blanking to the output signal including the color difference signal portion. The luminance signal Y' provided from adding circuit 7 has scanning lines of 525 per field according to the sequential scanning system. After the luminance signal Y' is synchronized with the chrominance signal by a delay element 8, it is converted to an analog signal by a D/A converter 9. The converted signal is applied to an adder 10.

The MUSE signal from A/D converter 3 is also applied to a synchronizing signal generating circuit 11. The synchronizing signal generating circuit 11 generates a synchronizing signal according to the sequential scanning system in response to the synchronizing signal of the MUSE signal. The generated synchronizing signal is applied to adder 10, where it is added to Y'.

The scanning line signal provided from selector 5a is also applied to a time axis expanding circuit 12, where the color difference signals R−Y and B−Y having the time axis compressed to ¼ is expanded four times. The line sequential signals of the red color difference signal R−Y and the blue color difference signal B−Y provided from expanding circuit 12 are applied to the first input terminal of a cross switching circuit 14 through a delay element 13 having a delay time of 1 horizontal period (H'/2). The output signal of expanding circuit 12 has a coefficient of ½ multiplied by an coefficient multiplier 15, to be applied to an adder 16. The output signal of delay element 13 is applied to a coefficient multiplier 18 through a delay element 17 having a delay time of 1 horizontal period (H'/2), where a coefficient of ½ is multiplied. The multiplied signal is provided to adder 16. The output signal of adder 16 is applied to the second input terminal of cross switching circuit 14.

The MUSE signal provided from A/D converter 3 is provided to a line discrimination circuit 19, where the line of the scanning line signal from selector 5a (denoted in parenthesis in FIG. 3) is discriminated. The discrimination signal provided from line discrimination circuit 19 is provided to cross switching circuit 14 as a control signal. The cross switching circuit 14 provides the signals of the odd number lines applied to the first and second input terminals via the first and second output terminals, respectively, in response to the discrimination signal. Meanwhile, the signals of even number lines applied to the first and second input terminals are provided via the first and second output terminals, respectively. In other words, the cross switching circuit 14 provides the current signals of odd number lines and the interpolation signals produced from the signals of odd number lines, alternately, through the first output terminal. More specifically, a red color difference signal R'−Y' according to the sequential scanning system of 525 lines/field is provided from the first output terminal.

The cross switching circuit 14 provides the current signals of the even number lines and the interpolation signals produced from the signals of even number lines alternately through the second output terminal. In other words, a blue color difference signal B'−Y' according to the sequential scanning system of 525 lines/field is provided through the second output terminal.

The color difference signals R'−Y' and B'−Y' provided from cross switching circuit 14 are provided to blanking adding circuits 20 and 21, respectively, where horizontal and vertical blanking are added. After conversion to analog signals by D/A converters 22 and 23, the converted analog signals are provided to modulation circuits 24 and 25. The modulation circuits 24 and 25 balance modulate the color subcarriers having a phase difference of 90° to each other by the color difference signals R'−Y' and B'−Y'. The output signals from modulation circuits 24 and 25 are added to an adder 26, where a carrier chrominance signal C' is provided.

The luminance signal Y' provided from adder 10 and the chrominance signal C' provided from adder 26 are provided to a monitor receiver 27. Accordingly, an image according to the sequential scanning system having 525 scanning lines per field (non-interlaced system) is displayed on the display screen of monitor receiver 27.

In the signal processing circuit 4 shown in FIG. 2, the scanning lines of the odd number field and the even number field of the MUSE signal of 1,125 lines/frame are each converted to 525 lines. Furthermore, the position of the scanning line signals of the odd number field is made to coincide with that of the even number field at registration processing portion 5, to obtain a video signal according to the sequential scanning system having 525 scanning lines per field. Since the disadvantageous process of increasing the once decreased scanning lines is not performed as in the conventional circuit shown in FIG. 1, the degradation of video signals by conversion is prevented. That is to say, the quality of the image displayed according to the converted video signals is improved.

Furthermore, in the circuit indicated in FIG. 2, the luminance signal Y and the color difference signals R−Y and B−Y are processed without being mixed, so that degradation of video signals caused by the mixture and separation of these signals as in conventional circuits shown in FIG. 1 may be prevented.

In addition, the system conversion device of FIG. 2 has simplified the circuit configuration because the process for producing video signals according to the NTSC system is not required. This reduces the scale of the circuit significantly which means that the cost to construct the circuit will also be reduced.

Figure 6:
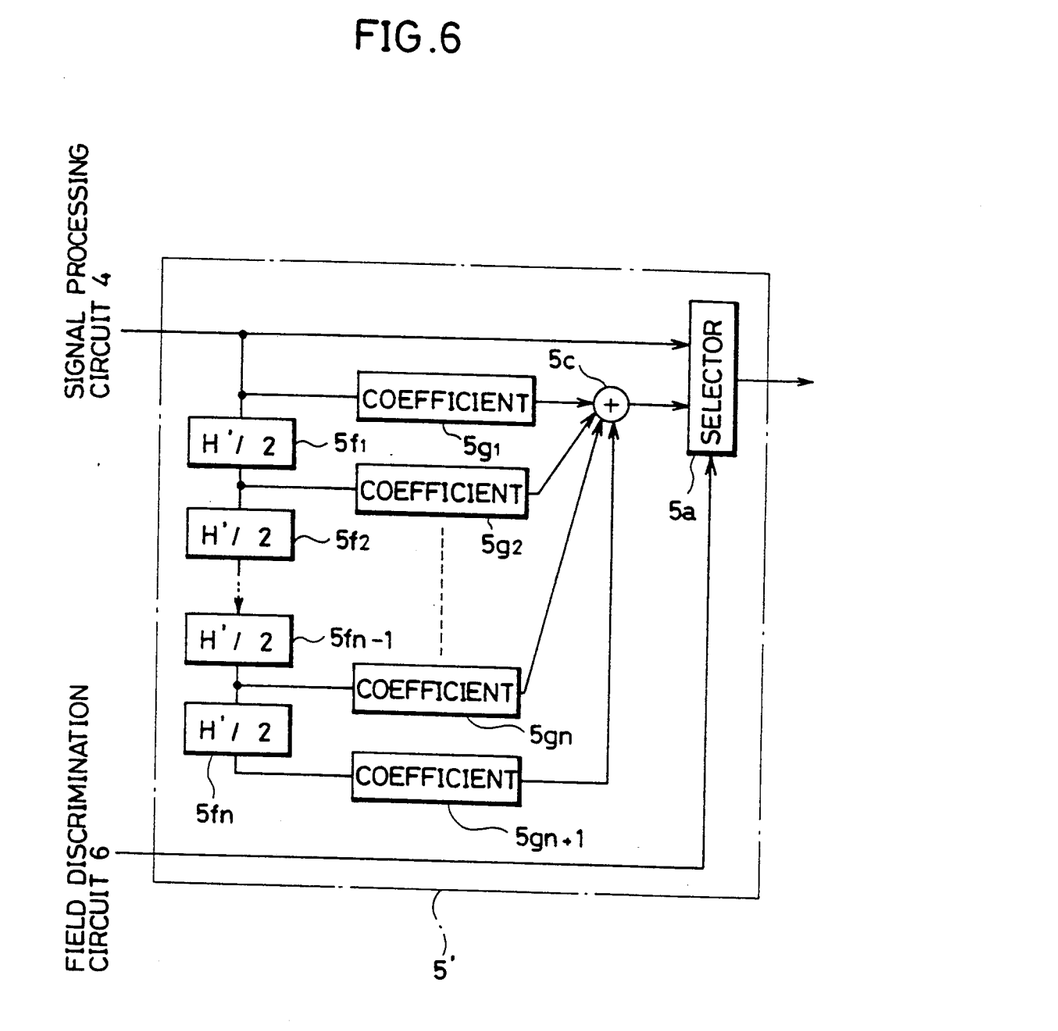
FIG. 6 is a block diagram showing another example 5' of the registration processing portion 5 of FIG. 2.

The registration processing portion 5 of FIG. 2 which produces interpolation signals from only the current signals and the signals of 1 horizontal period delayed for positioning the scanning line signals may be replaced by a circuit 5' shown in FIG. 6.

Referring to FIG. 6, the registration processing portion 5' comprises a plurality of delay elements 5f1 portion−5fn (n is a positive integer) each having a delay time of 1 horizontal period (H'/2), coefficient multipliers 5g1−5gn +1, an adder 5c, and a selector 5a. By applying registration processing portion 5', the scanning line of the even number field and the odd number field may be positioned to be consistent with each other. The application of registration processing portion 5' provides video signals with the picture quality further improved.

In the above embodiment, video signals according to a sequential scanning system having 525 scanning lines per field are produced from MUSE signals being bandwidth compressed. However, it is possible to apply the present invention to produce video signals based on a sequential scanning system from video signals based on a general high definition television system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system converter device for converting a first video signal having a first predetermined number of scanning lines per frame based on an interlaced scanning system to a second video signal having a second predetermined number of scanning lines per frame based on a sequential scanning system comprising:

receiving means for receiving the first video signal;

conversion means, operatively connected to said receiving means, for converting the first predetermined number of the scanning line signals for each field included in the first video signals to the second predetermined number; and registration means, operatively connected to said conversion means, for positioning scanning line signals of two continuous fields converted by said conversion means;

said registration means including, at least one delay means, operatively connected to an output of said conversion means, for delaying a signal of either an even or an odd number field converted by said conversion means by a predetermined period of time, adding means for adding a signal delayed by said delay means and a signal of the numbered field not delayed by said delay means, and selecting means, operatively connected to outputs of said conversion means and said adding means, for providing either signals from said conversion means or signals from said adding means.

2. The system converter device as claimed in claim 1, wherein said conversion means comprises extracting means for selectively extracting scanning line signals for each field in the first video signal to cause the second video signal to have a lesser number of scanning lines.

3. The system converter device as claimed in claim 1, wherein said registration means further comprises multiplication means, operatively connected to an output of said conversion means, for multiplying a signal from each field provided from said conversion means by a predetermined coefficient.

4. The system converter device as claimed in claim 1, wherein said conversion means comprises:

storage means, operatively connected to said receiving means for storing the first video signal;

first clock means for generating a first clock signal having a first frequency for use in an interlaced scanning system;

second clock means for generating a second clock signal having a second frequency for use in a sequential scanning system;

writing means, responsive to said first clock signal, for writing the first video signal to said storage means;

readout means, responsive to said second clock signal, for reading out data signals which have been written into said storage means; and intermittent halt means, operatively connected to said writing means, for intermittently halting writing operations of said writing means.

5. The system converter device as claimed in claim 1, wherein the first video signal is generated by a MUSE system, the first predetermined number of scanning lines is 1,125, the second video signal is to be utilized in a sequential scanning system, and the second predetermined number of scanning lines is 525.

6. The system converter device as claimed in claim 3, wherein said predetermined period of time comprises a period of time which is half a horizontal scanning period utilized in a sequential scanning system, and said predetermined coefficient is ½.

* * * * *